United States Patent [19]
Sato et al.

[11] 4,448,489
[45] May 15, 1984

[54] WIDE ANGLE LIQUID CRYSTAL DISPLAY THAT COPES WITH INTERFERENCE COLORING

[75] Inventors: Yukihiro Sato; Yoshimichi Shibuya, both of Mobara, Japan

[73] Assignee: Hitachi, Ltd., Tokyo, Japan

[21] Appl. No.: 378,745

[22] Filed: May 17, 1982

[30] Foreign Application Priority Data

May 22, 1981 [JP] Japan .................................. 56-76510

[51] Int. Cl.³ .............................................. G02F 1/133
[52] U.S. Cl. ...................................... 350/330; 350/335
[58] Field of Search ................ 350/335; 340/784, 765, 340/330, 337, 331 R, 334, 340, 344, 350 R

[56] References Cited

U.S. PATENT DOCUMENTS 4,394,069  7/1983  Kaye .............................. 350/335 X

FOREIGN PATENT DOCUMENTS 1332984 10/1973 United Kingdom ................ 350/335
2092769  8/1982 United Kingdom ................ 350/330

*Primary Examiner*—John K. Corbin
*Assistant Examiner*—David Lewis
*Attorney, Agent, or Firm*—Charles E. Pfund

[57] ABSTRACT

A liquid crystal display device assembly is of a two-layer construction including a first TN liquid crystal display device of a dot-matrix electrode pattern and a second TN liquid crystal display device of a segment electrode pattern disposed on the first display device in laminated relation. The product of refractivity anisotropy and thickness of the liquid crystal layer of the first liquid crystal display device is smaller than 0.6 μm, and that of the second liquid crystal display device is 0.6 μm or more.

2 Claims, 4 Drawing Figures

WIDE ANGLE LIQUID CRYSTAL DISPLAY THAT COPES WITH INTERFERENCE COLORING

BACKGROUND OF THE INVENTION

The present invention relates to a twisted nematic (TN) liquid crystal display device assembly of a two-layer construction.

Liquid crystal display devices in use today find two typical uses, namely, segment type display and dot-matrix type display, dependent on the type of pattern of the display electrode.

The TN liquid crystal display device of dot-matrix type display is flexible in display capability or can display many various characters, but gives the viewer a small angle of view in which displayed characters can be seen at a high contrast. The dot-matrix type display is therefore relatively poor in display quality. The segment type display device, such as using electrodes of a 7-segment pattern, is of a relatively high display quality; however, it can display numeric characters only, and fails to display information in the form of letters and picture images.

SUMMARY OF THE INVENTION

It is an object of the present invention to provide a liquid crystal display device assembly capable of making use of advantages of the segment type display and the dot-matrix type display thereby to assure high quality and flexibility of display with a single assembly.

According to the present invention, a liquid crystal display device assembly is of a two-layer construction comprising a first TN liquid crystal display device of a dot-matrix electrode pattern and a second TN liquid crystal display device of a segment electrode pattern disposed in laminated relation with the first display device with no polarizer sandwiched therebetween, wherein the product of refractively anisotropy $\Delta n$ and thickness d of the liquid crystal layer of said first liquid crystal display device is smaller than 0.6 $\mu m$, and the product of refractivity anisotropy $\Delta n$ and thickness d of the liquid crystal layer of said second liquid crystal display device is 0.6 $\mu m$ or more. When the first liquid crystal display device is driven on a time-sharing basis at a high frequency, it provides the display of various characters with a wide angle of view at a high contrast. When the second liquid crystal display device is driven, it gives numeric characters with a wide angle of view at a high contrast. Preferably, the second display device is superimposed on the first display device to reduce the displacement between a real image and a shadow.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1B:
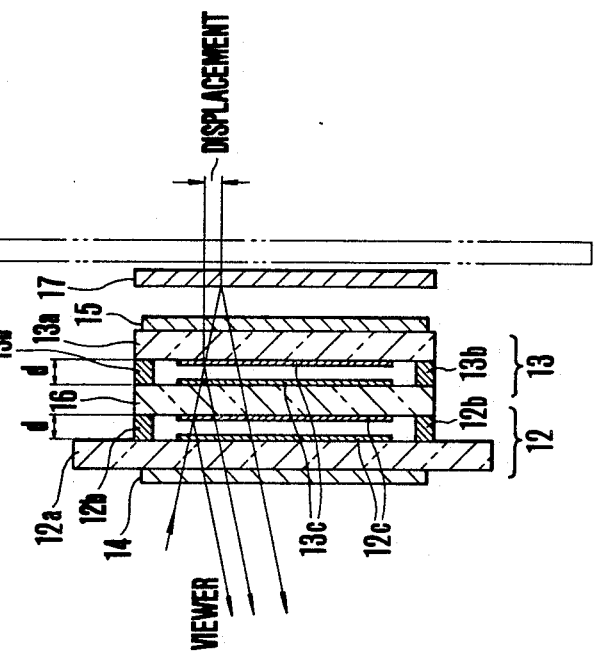
FIGS. 1a and 1b are plan and schematic sectional views, respectively, of a liquid crystal display device assembly according to the present invention.
Figure 1A:
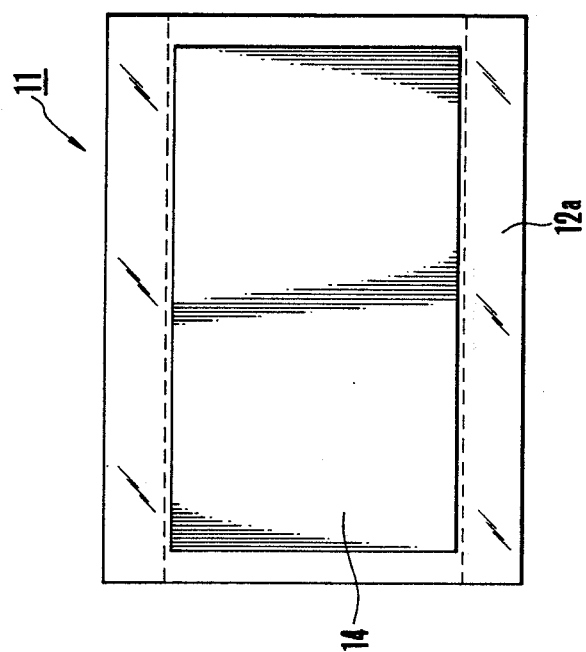

As shown in FIGS. 1a and 1b, a liquid crystal display device assembly 11 according to the present invention comprises an upper liquid crystal display layer 12 and a lower liquid crystal display layer 13 on which the upper liquid crystal display layer 12 is disposed in laminated relation. An upper polarizer 14 is mounted on the upper liquid crystal display layer 12, and a lower polarizer 15 is mounted on the lower liquid display layer 13 remotely from the upper polarizer 14. No polarizer is sandwiched between the upper and lower liquid crystal display layers 12 and 13. The upper liquid crystal display layer 12 is comprised of a TN liquid crystal display device of a segment type display using electrodes of a 7-segment pattern. The lower liquid crystal display layer 13 comprises a TN liquid crystal display device of a dot-matrix type display using electrodes in a dot-matrix pattern.

Specifically, in the display layer 12, a transparent substrates 12a and 16 define, together with sealing members 12b, a space in which twisted nematic liquid crystal molecules are filled and there are formed opposing electrodes of the 7-segment pattern; and in display layer 13, the transparent substrate 16 and a transparent substrate 13a define, together with sealing members 13b, a space in which twisted nematic liquid crystal molecules are filled and there are formed opposing electrodes in the dot-matrix pattern. The substrate 16 is used in common to the display layers 12 and 13.

Figure 2:
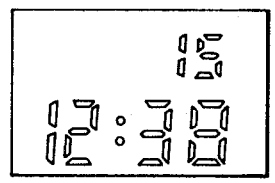
FIG. 2 is a diagram showing a display generated by an upper layer of the liquid crystal display device assembly shown in FIGS. 1a and 1b.
Figure 3:
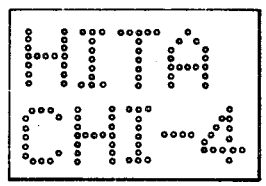
FIG. 3 is a diagram illustrative of another display produced by a lower layer of the liquid crystal display device assembly of FIGS. 1a and 1b.

When the upper liquid crystal display layer 12 is driven, seven-segment numeric characters are displayed as shown in FIG. 2 to provide high quality display. When the lower liquid crystal display layer 13 is driven, on the other hand, various characters such as letters, numerals and other symbols are displayed in a dot-matrix pattern as illustrated in FIG. 3.

TN liquid crystal display devices generally have an increased degree of contrast and a wide angle of view when the product of refractivity anisotropy $\Delta n$ and thickness d of the liquid crystal layer is smaller than 0.6 $\mu m$. Where the product of $\Delta n \cdot d$ is too small, there result fabrication and quality problems such as a tendency to present an interference color. To cope with such difficulties, the lower liquid crystal display device of the dot-matrix pattern has a liquid crystal layer thickness $d < 6\ \mu m$ and a refractivity anisotropy $\Delta n < 0.1$ to increase the angle of view at a high contrast for improved display characteristics. The upper liquid crystal display device of the segment pattern, which is not required to increase its angle of view, has $d \geq 6\ \mu m$ and $\Delta n \geq 0.1$.

With the above arrangement of the present invention, it is possible to make use of advantages of the segment type display and the dot-matrix type display to ensure that high quality and flexibility of display can be obtained with a single assembly. Preferably, the segment type display device is superimposed on the dot-matrix type display device as shown in FIG. 1b. This is because while the viewer observes a real image generated in the segment type display device, he observes a real image generated in the dot-matrix type display and a shadow thereof reflected at a reflector 17; and if the dot-matrix type display device is superimposed on the segment type display device in contrast to the illustration of FIG. 1b, the distance between the dot-matrix type display device and the reflector is increased to increase the displacement between real image and shadow, thus making obscure the image. Reference numeral 18 denotes a printed circuit board.

Although a certain preferred embodiment of the present invention has been shown and described, it should be understood that various changes and modifications may be made therein without departing from the scope of the appended claims.

What is claimed is:

1. A liquid crystal display device assembly comprising:
a first liquid crystal display device including a pair of substrates having electrodes in a dot-matrix pattern and a TN liquid crystal layer sandwiched between said substrates; and a second liquid crystal display device disposed in laminated relation with said first liquid crystal display device and including a pair of substrates having electrodes in a segment pattern and a TN liquid crystal layer sandwiched between said last-mentioned substrates, wherein the product of refractivity anisotropy $\Delta n$ and thickness d of the liquid crystal layer of said first liquid crystal display device is smaller than 0.6 $\mu$m, and the product of refractivity anisotropy $\Delta n$ and thickness d of the liquid crystal layer of said second liquid crystal display device is 0.6 $\mu$m or more.

2. A liquid crystal display device assembly according to claim 1 wherein said second liquid crystal display device is superimposed on said first liquid crystal display device.

* * * * *